United States Patent
Parihar et al.

(10) Patent No.: US 12,259,712 B2
(45) Date of Patent: Mar. 25, 2025

(54) METHOD AND SYSTEM FOR IRONMAKING PLANT OPTIMIZATION

(71) Applicant: Tata Consultancy Services Limited, Mumbai (IN)

(72) Inventors: Manendra Singh Parihar, Pune (IN); Venkataramana Runkana, Pune (IN); Sri Harsha Nistala, Pune (IN); Rajan Kumar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 426 days.

(21) Appl. No.: 17/936,207

(22) Filed: Sep. 28, 2022

(65) Prior Publication Data

US 2023/0130462 A1    Apr. 27, 2023

(30) Foreign Application Priority Data

Oct. 21, 2021   (IN) .............................. 202121047962

(51) Int. Cl.
 *G05B 19/4155* (2006.01)
(52) U.S. Cl.
 CPC ................... *G05B 19/4155* (2013.01); *G05B 2219/31372* (2013.01)

(58) Field of Classification Search
None
See application file for complete search history.

(56) References Cited

U.S. PATENT DOCUMENTS

2022/0179400 A1*  6/2022  Deodhar ................. H04L 67/12

FOREIGN PATENT DOCUMENTS

| CN | 104102821 A | 11/2017 |
|---|---|---|
| CN | 106228011 A | 1/2019 |

* cited by examiner

*Primary Examiner* — Sean Shechtman
(74) *Attorney, Agent, or Firm* — FINNEGAN, HENDERSON, FARABOW, GARRETT & DUNNER LLP

(57) ABSTRACT

State-of-the-art systems used for plant monitoring and optimization fail to efficiently monitor and improve the performance of blast furnace ironmaking plants due to complexity of such plants. In addition, they attempt optimization without considering the operational stability of the blast furnace. The disclosure herein generally relates to industrial plant monitoring, and, more particularly, to a method and system for ironmaking plant optimization. The system determines an operational stability of the plant in terms of value of a determined Blast Furnace Stability Index (BFSI). Further, if the BFSI or one or more Key Performance Indicators (KPIs) of the plant deviates from corresponding threshold, then the optimization is done.

17 Claims, 11 Drawing Sheets

METHOD AND SYSTEM FOR IRONMAKING PLANT OPTIMIZATION

PRIORITY CLAIM

This U.S. patent application claims priority under 35 U.S.C. § 119 to: Indian Patent Application number 202121047962, filed on Oct. 21, 2021. The entire contents of the aforementioned application are incorporated herein by reference.

TECHNICAL FIELD

The disclosure herein generally relates to iron and steel making, and, more particularly, to a method and system for optimization of the ironmaking process in an ironmaking plant.

BACKGROUND

The ironmaking plant typically comprises of pre-ironmaking units such as sinter plant(s), pellet plant(s) and coke plant(s) and one or more blast furnaces. The pre-ironmaking units prepare the ferrous and carbonaceous raw materials before being fed to the blast furnace. The blast furnace (or alternately referred to as 'furnace'), is a multiphase counter-current packed bed reactor that is used to reduce iron oxide containing materials such as lumps, sinter and pellets to iron (alternately referred to as 'hot metal') using metallurgical coke as a reducing agent as well as a source of energy. Various Key Performance Indicators (KPIs) of the furnace such as but not limited to fuel rate, productivity, hot metal silicon, hot metal temperature, and number of unplanned shutdowns have significant impact on the economics of the entire ironmaking plant. The KPIs are strongly impacted by changes in raw materials as well as environmental conditions such as ambient temperature and rainfall. Given the large number of process parameters to be monitored in each of the units, it is not practical for operators to identify appropriate process settings required for efficient, safe, and fault-free operation of the ironmaking plant with varying input raw materials and environmental conditions.

To tackle this problem, process optimization is carried out in ironmaking plants to improve productivity and quality of hot metal, and reduce fuel consumption and emissions from the blast furnace while handling continuous changes in raw material quality and wear and tear of the furnace. Process optimization is enabled by the use of physics-based models built using first principles and domain knowledge and/or data driven models developed from historic operations data using machine learning or statistical techniques.

However, state-of-the-art process optimization approaches fail to improve the performance of ironmaking plants as they consider only blast furnace operation in isolation without considering the impact of pre-ironmaking units on ironmaking plant operations. Further, one of the most critical aspects of blast furnace operation, i.e., operational stability is not considered while performing process optimization. The operational stability of the blast furnace can be inferred from cohesive zone (CZ) characteristics of the blast furnace that control the flow of gas, solid and liquid through the furnace and influence the permeability and the temperature distribution inside the furnace. However, the CZ characteristics can be obtained only from high fidelity 2D/3D physics-based models of the blast furnace. There are no means to estimate the CZ characteristics and, therefore, operational stability of the furnace which is critical for efficient operation of the ironmaking plant from real time operation data.

SUMMARY

Embodiments of the present disclosure present technological improvements as solutions to one or more of the above-mentioned technical problems recognized by the inventors in conventional systems. For example, in one embodiment, a processor implemented method for optimization of an ironmaking plant is provided. Initially, data from a plurality of data sources of the ironmaking plant are collected as input data, via one or more hardware processors. The input data is then pre-processed to generate a pre-processed data, via the one or more hardware processors, wherein the pre-processing of the input data includes conditioning the input data to satisfy one or more pre-defined data quality requirements. Further, a simulated data is obtained via the one or more hardware processors, using the pre-processed data and a plurality of soft sensors, wherein the simulated data is integrated with the pre-processed data to obtain an integrated data. Further, a first set of parameters is determined via the one or more hardware processors, using the integrated data and a plurality of data-driven models, for a plurality of pre-ironmaking units of the ironmaking plant. Further, a second set of parameters is obtained via the one or more hardware processors, by combining the integrated data with the first set of parameters. Further, a set of key performance indicators (KPIs) is forecasted via the one or more hardware processors, using the second set of parameters and the plurality of data-driven models of a blast furnace of the ironmaking plant. Further, a stability score of the blast furnace is determined using the forecasted KPIs, the integrated data, and a plurality of stability score soft sensors, via the one or more hardware processors, wherein the stability score represents a determined operating stability of the blast furnace. Further, any deviation of one or more of the forecasted KPIs or the stability score from a corresponding pre-determined threshold is monitored via the one or more hardware processors. If the deviation from the pre-determined threshold is detected, then optimization of one or more of the forecasted KPIs is configured, using the determined stability score as a constraint, via the one or more hardware processors. Further, one or more recommendations are generated based on the configured optimization of the one or more KPIs, via the one or more hardware processors.

In another aspect, a system for optimization of an ironmaking plant is provided. The system includes one or more hardware processors, a user interface, and a memory storing a plurality of instructions. The plurality of instructions when executed, cause the hardware processors to collect data from a plurality of data sources of the ironmaking plant as input data. The system then pre-processes the input data to generate a pre-processed data, wherein the pre-processing of the input data includes conditioning the input data to satisfy one or more pre-defined data quality requirements. Further, the system obtains a simulated data using the pre-processed data and a plurality of soft sensors, wherein the simulated data is integrated with the pre-processed data to obtain an integrated data. Further, a first set of parameters is determined using the integrated data and a plurality of data-driven models, for a plurality of pre-ironmaking units of the ironmaking plant. Further, a second set of parameters is obtained by combining the integrated data with the first set of parameters. Further, a set of key performance indicators (KPIs) is forecasted using the second set of parameters and the plurality of data-driven models of a blast furnace of the ironmaking plant. Further, a stability score of the blast furnace is determined using the forecasted KPIs, the integrated data, and a plurality of stability score soft sensors, wherein the stability score represents a determined operating stability of the blast furnace. Further, any deviation of one or more of the forecasted KPIs or the stability score from a corresponding pre-determined threshold is monitored and if the deviation is detected, then the system configures optimization of one or more of the forecasted KPIs, using the determined stability score as a constraint. Further, one or more recommendations are generated based on the configured optimization of the one or more KPIs.

In yet another aspect, a non-transitory computer readable medium for optimization of an ironmaking plant is provided. The non-transitory computer readable medium includes a plurality of instructions, which when executed cause the one or more hardware processors to perform the following steps for optimization of the ironmaking plant. Initially, data from a plurality of data sources of the ironmaking plant are collected as input data, via one or more hardware processors. The input data is then pre-processed to generate a pre-processed data, via the one or more hardware processors, wherein the pre-processing of the input data includes conditioning the input data to satisfy one or more pre-defined data quality requirements. Further, a simulated data is obtained via the one or more hardware processors, using the pre-processed data and a plurality of soft sensors, wherein the simulated data is integrated with the pre-processed data to obtain an integrated data. Further, a first set of parameters is determined via the one or more hardware processors, using the integrated data and a plurality of data-driven models, for a plurality of pre-ironmaking units of the ironmaking plant. Further, a second set of parameters is obtained via the one or more hardware processors, by combining the integrated data with the first set of parameters. Further, a set of key performance indicators (KPIs) is forecasted via the one or more hardware processors, using the second set of parameters and the plurality of data-driven models of a blast furnace of the ironmaking plant. Further, a stability score of the blast furnace is determined using the forecasted KPIs, the integrated data, and a plurality of stability score soft sensors, via the one or more hardware processors, wherein the stability score represents a determined operating stability of the blast furnace. Further, any deviation of one or more of the forecasted KPIs or the stability score from a corresponding pre-determined threshold is monitored via the one or more hardware processors. If the deviation from the pre-determined threshold is detected, then optimization of one or more of the forecasted KPIs is configured, using the determined stability score as a constraint, via the one or more hardware processors. Further, one or more recommendations are generated based on the configured optimization of the one or more KPIs, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
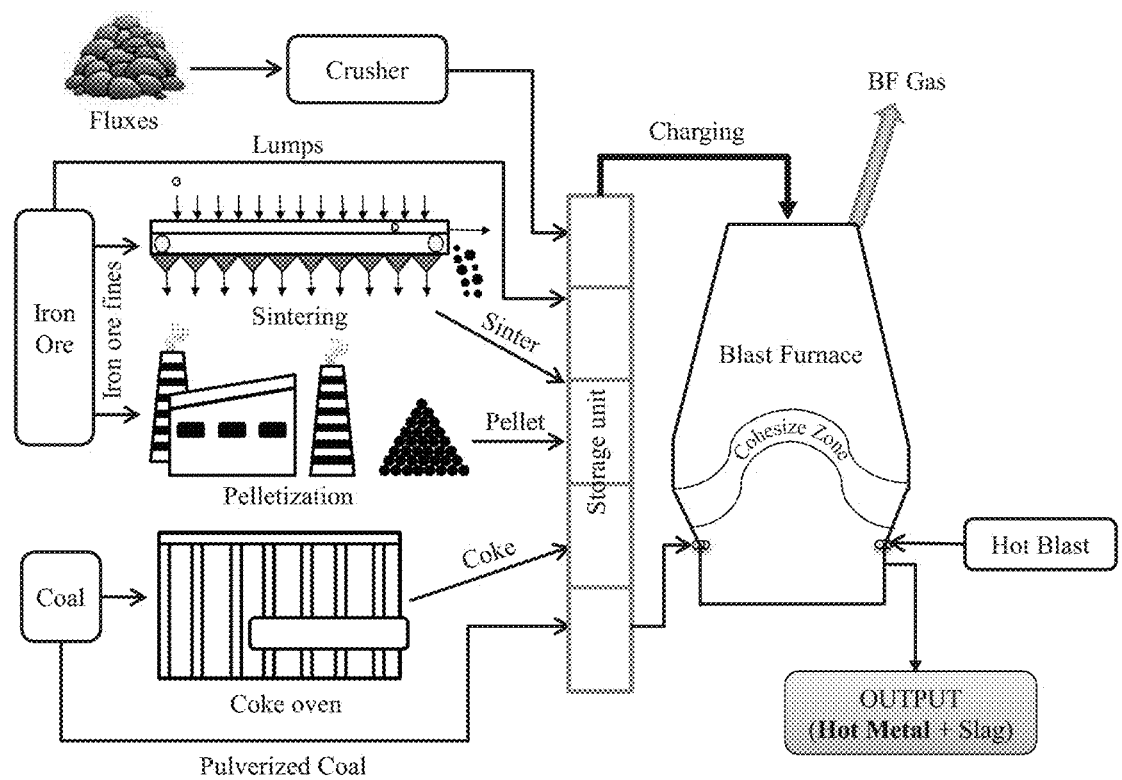
FIG. 1 illustrates an exemplary ironmaking plant, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 illustrates an exemplary iron-making plant, according to some embodiments of the present disclosure.

The ironmaking plant typically comprises of pre-ironmaking units and one or more blast furnaces. The pre-ironmaking units comprising of one or more sinter plants, pellet plants and coke plants prepare the raw materials to be fed into the blast furnace. The sinter and pellet plants agglomerate iron ore fines (less than 10 mm in diameter) into iron ore sinter and pellets respectively. Coke plant converts coal into metallurgical coke. The prepared sinter, pellets and coke are typically in storage units or silos. Fluxes such as limestone and dolomite are crushed and are also stored in silos. Iron ore lumps (10-40 mm in diameter) are also kept in silos. All the prepared and sized raw materials (iron ore lumps, sinter, pellets, coke, and fluxes) are withdrawn from their respective storage bins in predetermined quantities, mixed and charged from the top of the blast furnace. A blast furnace is a counter-current packed bed reactor that converts iron oxide in lumps, sinter, and pellets into pig iron (hot metal) using carbon from coke as the reducing agent. As the materials descent from the top of the blast furnace, they get heated due to the hot gas rising from the bottom of the furnace. The hot gas comprising primarily of CO, $CO_2$ and $N_2$ is generated from combustion of coke and pulverized coal injected from multiple tuyeres along with hot blast (air and steam mixture heated to 1000-1200° C.). As the burden descents, increasing temperature and reducing atmosphere lead to various reduction reactions that convert higher iron oxides ($Fe_2O_3$ and $Fe_3O_4$) into lower iron oxide (FeO). Simultaneously, impurities/gangue comprises of silica ($SiO_2$) and alumina ($Al_2O_3$) present in the raw materials react with CaO and MgO present in fluxes to form slag. The mixture of lower iron oxide and slag soften at temperatures greater than 1100° C. and melt at temperatures >1400° C. The temperature zone in the furnace between the softening and melting regions is known as the cohesive zone (CZ) and largely comprises of solid coke particles. As the molten iron oxide pass through the cohesive zone, the final stage of reduction takes places and metallic iron is formed. Metallic iron and slag drip from below the cohesive zone into the hearth where they accumulate for a few hours before they are taken out of the furnace together. This periodic process of collecting hot metal and slag is called tapping which can last up to 2 hours. The hot metal is separated from the slag and subsequently refined to produce steel.

The blast furnace is critical to the ironmaking plant as it has the capacity to absorb changes in sinter, pellet and coke quality which may be caused by external disturbances and produce hot metal with a consistent quality. Therefore, optimizing the performance of the blast furnace optimizes the overall performance of the ironmaking plant. In the blast furnace, the location and thickness of the cohesive zone is crucial to the stability and performance of the blast furnace as it controls the flow of gas, solid and liquid through the furnace and also influences the permeability and the temperature distribution inside the furnace. Therefore, cohesive zone properties further play a key role in optimizing the performance of the furnace and the ironmaking plant.

Figure 2:
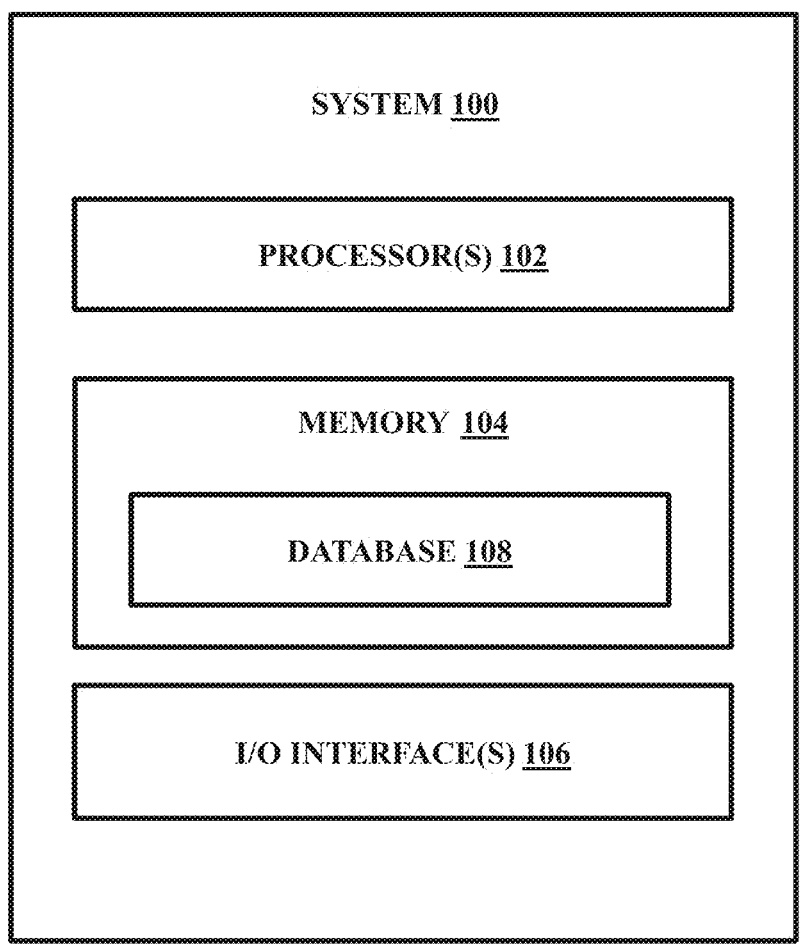
FIG. 2 is a block diagram of a system for performing optimization of the ironmaking plant, according to some embodiments of the present disclosure.

FIG. 2 is a block diagram of a system for performing optimization of the blast furnace ironmaking plant, according to some embodiments of the present disclosure.

In an embodiment, the system 100 includes a processor(s) 102, communication interface device(s), alternatively referred as input/output (I/O) interface(s) 106, and one or more data storage devices or a memory 104 operatively coupled to the processor(s) 102. The system 100 with one or more hardware processors is configured to execute functions of one or more functional blocks of the system 100.

Referring to the components of system 100, in an embodiment, the processor(s) 102, can be one or more hardware processors 102. In an embodiment, the one or more hardware processors 102 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 are configured to fetch and execute computer-readable instructions stored in the memory 104. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to take appropriate inputs and display optimal recommendations to the users and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 104 includes a database 108 that stores all data associated with the process of blast furnace/iron making plant monitoring and optimization, being performed by the system 100. For example, the database 108 stores the configurable instructions that are executed to cause the one or more hardware processors 102 to perform various steps associated with the ironmaking plant optimization. The database 108 may further store all data, i.e. data collected as input from the ironmaking plant and other sources, various intermediate data generated during processing of the input data for the optimization, optimizations configured for different units/processes of the ironmaking plant, recommendations generated and so on.

Figure 3:
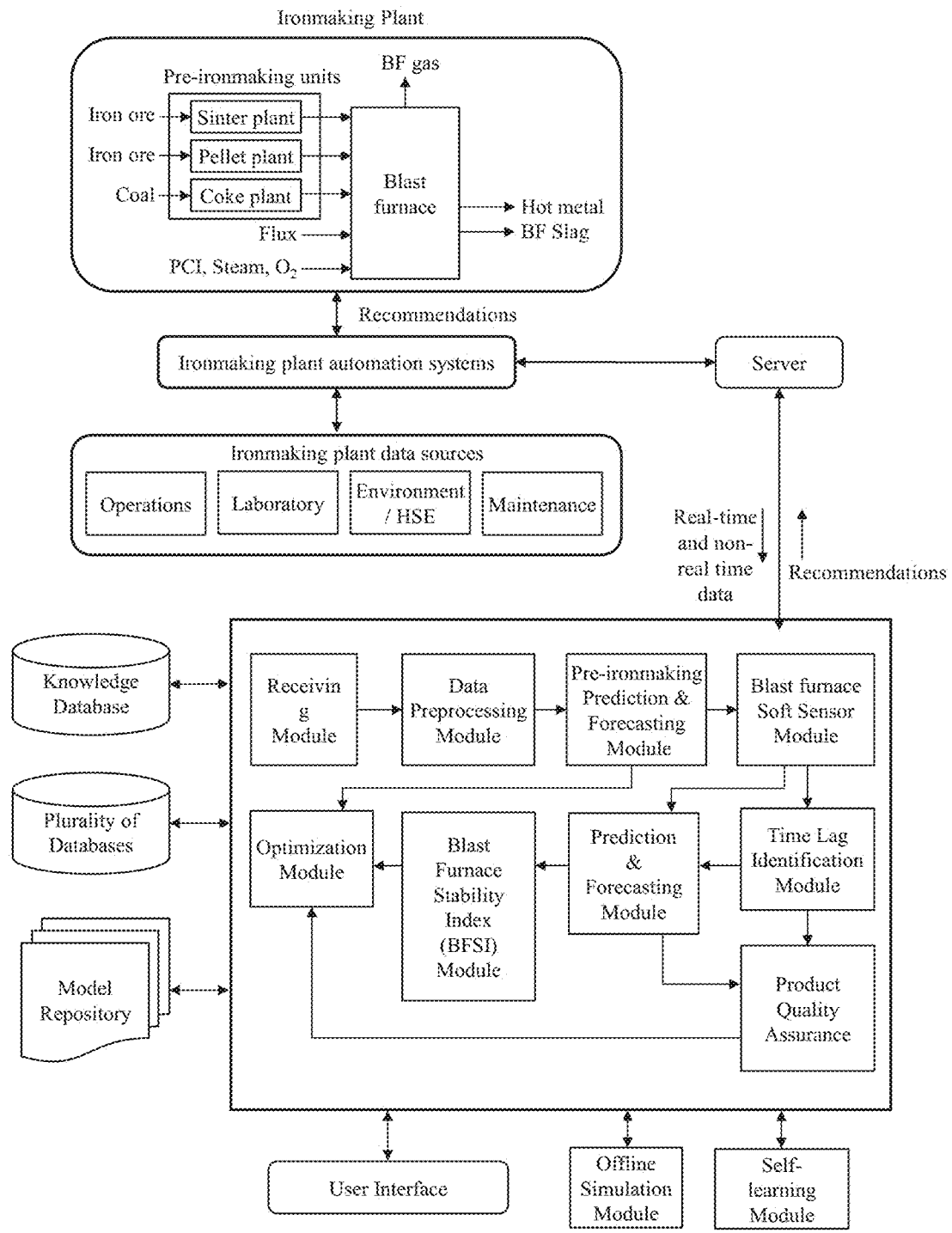
FIG. 3 illustrates a functional block diagram of the system of FIG. 2, in accordance with some embodiments of the present disclosure.
Figure 4:
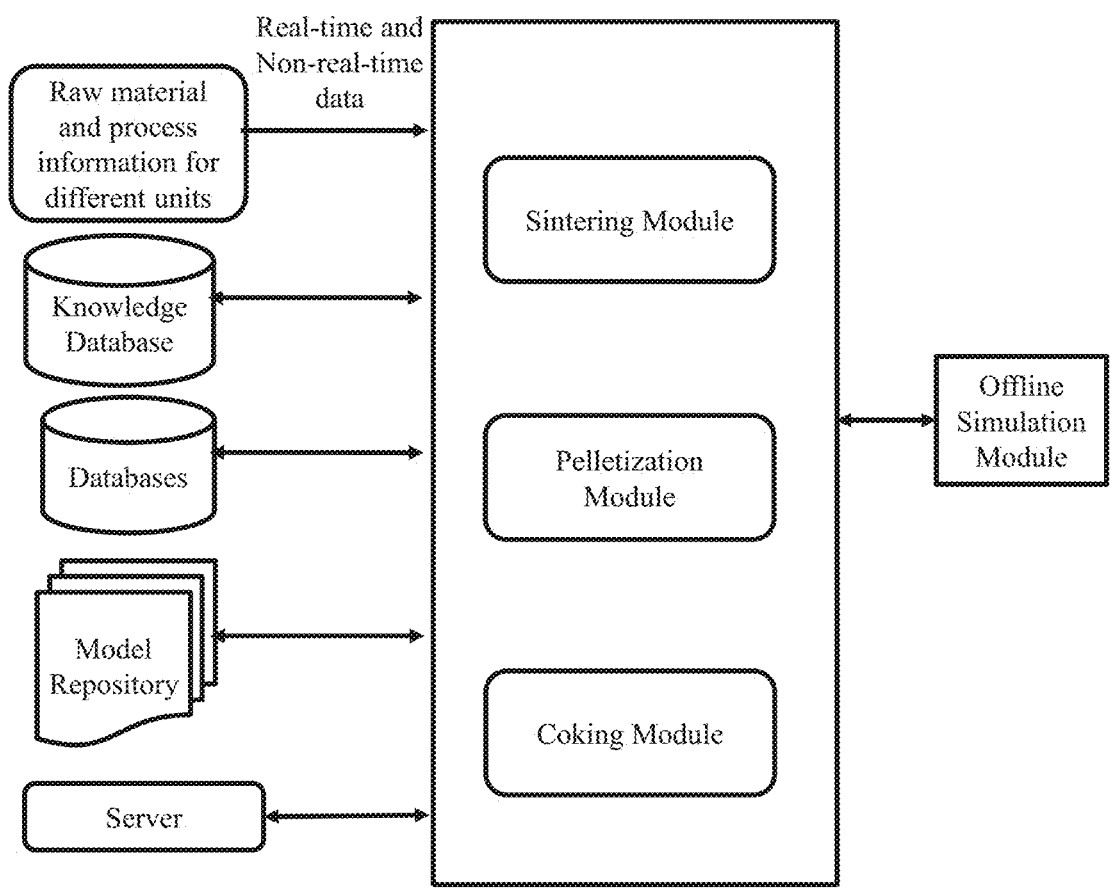
FIG. 4 is a block diagram of a pre-ironmaking module of the system of FIG. 3, according to some embodiments of the present disclosure.
Figure 5:
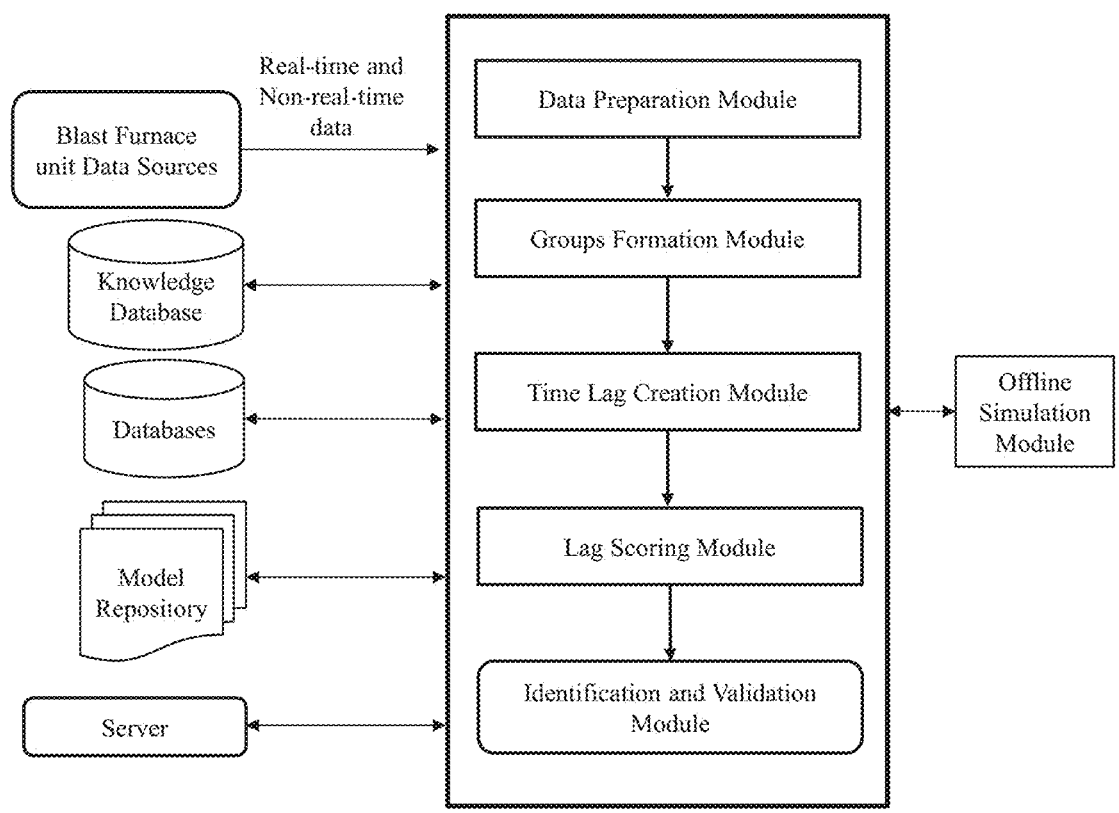
FIG. 5 is a block diagram of a time lag identification module of the system of FIG. 3, according to some embodiments of the present disclosure.

A functional implementation of the system 100 is given in FIG. 3. The functional implementation of the system 100 as in FIG. 3 includes a receiving module, a data pre-processing module, a pre-ironmaking prediction and forecasting module, a blast furnace soft sensor module, a time lag identification module, a prediction and forecasting module, a blast furnace stability index (BFSI) module, an optimization module, a product quality assurance module, a self-learning module, an offline simulation module, a user interface, and a plurality of databases. Functions of the components of the system 100, and of various components of the functional implementation in FIG. 3 are explained in conjunction with the flow diagrams in FIG. 9, and the components of various modules of the system 100, as depicted in FIG. 3 through FIG. 5, FIG. 7, and FIG. 8.

According to an embodiment of the present disclosure, referring to FIG. 3, the knowledge database constitutes prior process knowledge as well as user knowledge derived from one or more modules of the system 100. The knowledge database also comprises knowledge derived from multitude of simulations performed by the offline simulation module, knowledge of influence of various raw materials on the blast furnace, performance information of the plurality of physics-based and data-driven models of the ironmaking plant, and process quality assurance related information in the plant. Data from the knowledge database is accessed and used by a plurality of modules of the system 100, during various stages of the ironmaking plant optimization, as required.

According to an embodiment of the disclosure, referring to FIG. 1, the model repository comprises physics-based models, data-driven models, soft sensor models and configured optimization models of the ironmaking plant.

In step 902 of method 900, the system 100 collects real-time and non-real-time data with respect to operation of the ironmaking plant, as input data. The system 100 may collect the input data from one or more data sources such as operations database, laboratory database, environment database, maintenance database, etc., associated with various units (sinter plant, pellet plant, coke plant and blast furnace) of the ironmaking plant. For example, a plurality of sensors attached to different equipment/components of the units in the ironmaking plant provide real-time information on various parameters such as temperatures, pressures, flow rates, levels, valve opening percentages, vibrations, chemical composition of gases, dust levels, power consumption, motor currents, motor RPM, etc. being monitored. Data from the plurality of sensors is stored in the operations database. Non-real-time data related to the quality of raw materials, byproducts, and products such as chemical composition, particle size distribution, density, and microstructure information, etc. is typically stored and collected from laboratory databases. Environment data such as ambient temperature, atmospheric pressure, ambient humidity, rainfall, etc. is stored and collected from an environment database. Maintenance data such as planned and unplanned maintenance activities performed on one or more units of the plant, and condition and health of the process and various units in the plant is available and collected from maintenance databases. In another embodiment, the information on various parameters being monitored and tested are collected and stored in a server which is in connection with the system 100, and the system 100 in this scenario, collects the input data from the server, periodically or in real-time as configured. The input data may be from different parts of components of the Blast furnace ironmaking plant, for example, from different locations corresponding to the coke, sinter, and pellet making units and so on, as in the pre-ironmaking module depicted in FIG. 4.

The input data may be in raw format and may be of less quality due to presence of outliers and noise. The system 100 may require the input data to meet/satisfy certain pre-defined data quality requirements to utilize and process the data further. For example, the system 100 may require all the noise to be removed or limit noise level below a pre-defined value. Other data quality requirements include removal of outliers, imputation of missing data, unification of sampling frequency, and synchronization and integration of data from multiple data sources and units of the ironmaking plant. Depending on the data quality requirements pre-defined and configured with the system 100, the system 100 may use appropriate techniques to process and condition the input data as required, at step 904.

Further, at step 906, the system 100 obtains a simulated data using the pre-processed data and a plurality of soft sensors. The pre-processed data may not have all information pertaining to the operation of the units in the ironmaking plant. For example, due to reasons such as but not limited to lack of instrumentation due to complexity of the ironmaking plant, and failure of one or more sensors deployed, all data required for monitoring the performance of the ironmaking plant may not have been received as the input data. To compensate for the missing information, the system 100 may use the plurality of physics-based and data-driven soft sensors and generate the missing data. For example, the size distribution, mean diameter, chemical composition of the mixture of raw materials entering the furnace cannot be measured but can be estimated using soft sensors using the properties and flow rates of individual raw materials. The data generated using the plurality of soft sensors forms the simulated data. Further, the system 100 integrates the simulated data with the pre-processed data to obtain an integrated data.

Further, at step 908, the system 100 determines a first set of parameters using the integrated data and a plurality of data-driven models. The first set of parameters represents the key performance indicators (KPIs) of the pre-ironmaking units that are predicted and forecasted using a plurality of data-driven models developed using historical operating data of the pre-ironmaking units. For the sinter plant, the KPIs include sinter plant productivity, sinter yield, fuel rate, and sinter quality parameters such as tumbler index (TI), reduction degradation index (RDI), reducibility (RI) and mean diameter. For the pellet plant, the KPIs include pellet plant productivity, pellet yield, fuel rate and pellet quality parameters such as TI, cold compressive strength (CCS), RDI, RI and mean diameter. For the coke plant, the KPIs include coke strength after reduction (CSR), coke reducibility index (CRI), coke mean diameter, etc. The first set of parameters represent the real-time performance of the pre-ironmaking units and are important for the real-time plant-wide process optimization of the ironmaking plant.

Further, at step 910, the system 100 obtains a second set of parameters by combining the first set of parameters with the integrated data. Appropriate time lags corresponding to the residence times of materials in each of the pre-ironmaking units and the blast furnace, transport times from each of the pre-ironmaking units to the blast furnace and storage times of prepared materials (sinter, pellet and coke) at the blast furnace are incorporated in the first set of parameters when integrating them with integrated data to obtain the second set of parameters. For example, if the transport time from sinter plant to the blast furnace is 30 min, the received sinter is stored in silos for 8 hours before being charged into the furnace and the residence of sinter in the furnace is 7 hours, then the timestamps of the first set of parameters corresponding to the sinter plant are shifted by 15.5 hours when merging with the integrated data to obtain second set of parameters to be used further for predicting and forecasting of KPIs of the blast furnace.

Further, at step 912, the system 100 forecasts a set of key performance indicators of the blast furnace using the second set of parameters and the plurality of data driven models of the blast furnace. For example, hot metal silicon content is an important KPI representing the product quality and blast furnace thermal conditions. Hot metal silicon is tested in the laboratory after the hot metal is collected from the furnace and the test results are usually received in 2-4 hours after the sample is collected. Any corrective action that may be required to adjust the deviations in hot metal quality from desired range is therefore delayed. In the step, the hot metal silicon can be forecasted for the next 'N' (e.g., N=2 with N being a configurable parameter) tapping cycles using the second set of parameters and data-driven forecasting models developed for hot metal silicon that are developed using historical data of blast furnace operation. Since the hot metal silicon is forecasted in advance, it can be monitored by the operators for deviations and corrective actions, if any required, can be taken well in advance to correct the silicon content for the next few taps. If the forecasted deviation is significant, process optimization can also be initiated to identify optimal settings to correct the expected deviations in hot metal silicon. Process diagnostics can also be carried out on the forecasted values to identify the root causes of expected deviations. Similar forecasts can be made from other blast furnace KPIs such as productivity, fuel rate, hot metal temperature, blast furnace gas composition, etc. all of which will assist in effective monitoring, deviation detection & diagnostics, and process optimization of the blast furnace. It should be noted that the plurality of data-driven models used in this step are built using machine learning and deep learning techniques that include variants of regression (multiple linear regression, stepwise regression, forward regression, backward regression, partial least squares regression, principal component regression, Gaussian process regression, polynomial regression, etc.), decision tree and its variants (random forest, bagging, boosting, bootstrapping), support vector regression, k-nearest neighbors regression, spline fitting or its variants (e.g. multi adaptive regression splines), artificial neural networks and it variants (multilayer perceptron, recurrent neural networks and its variants e.g. long short term memory networks, and convolutional neural networks) and time series regression and forecasting models. The models can be point models (that do not consider temporal relationship among data instances) or time series models (that consider temporal relationship among data instances).

Figure 6:
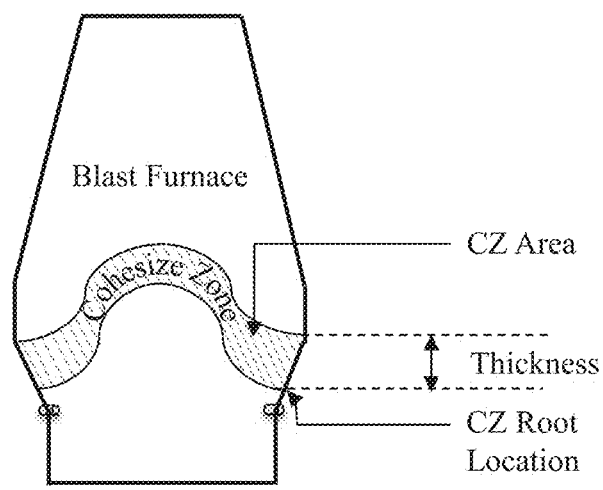
FIG. 6 is a block diagram depicting Cohesive Zone (CZ) area, and thickness and root location of the CZ, according to some embodiments of the present disclosure.
Figure 7:
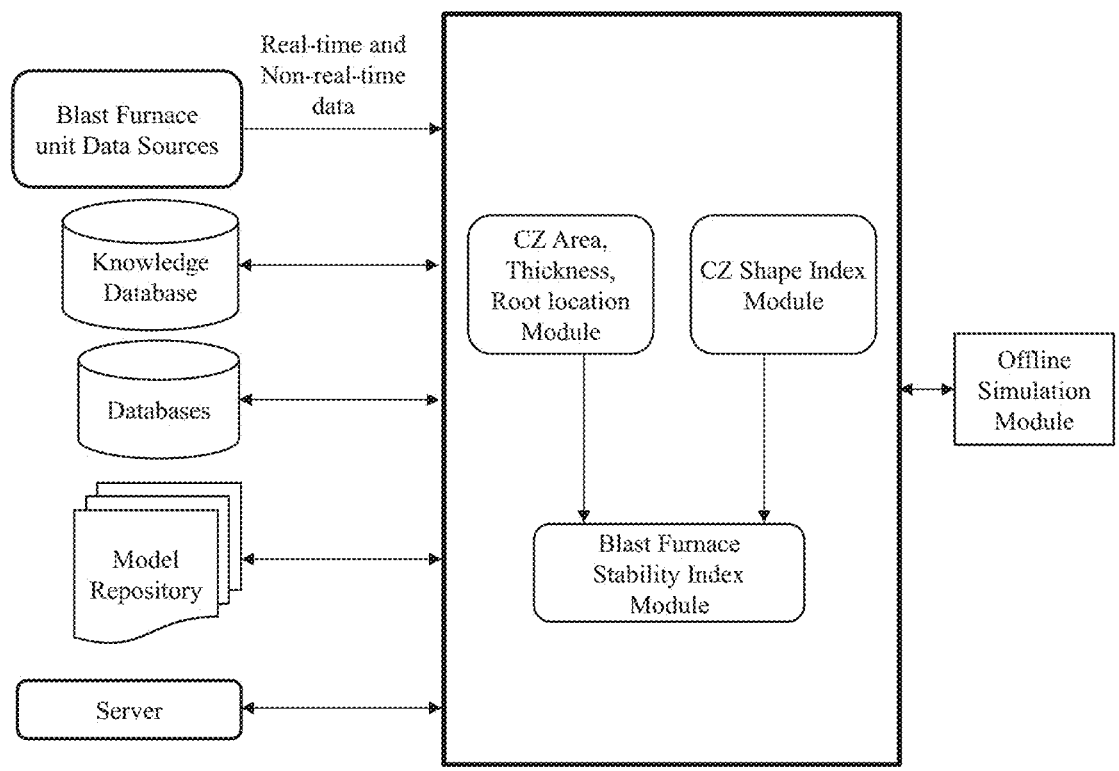
FIG. 7 is a block diagram of a Blast Furnace Stability Index (BFSI) module of the system of FIG. 3, according to some embodiments of the present disclosure.
Figure 8:
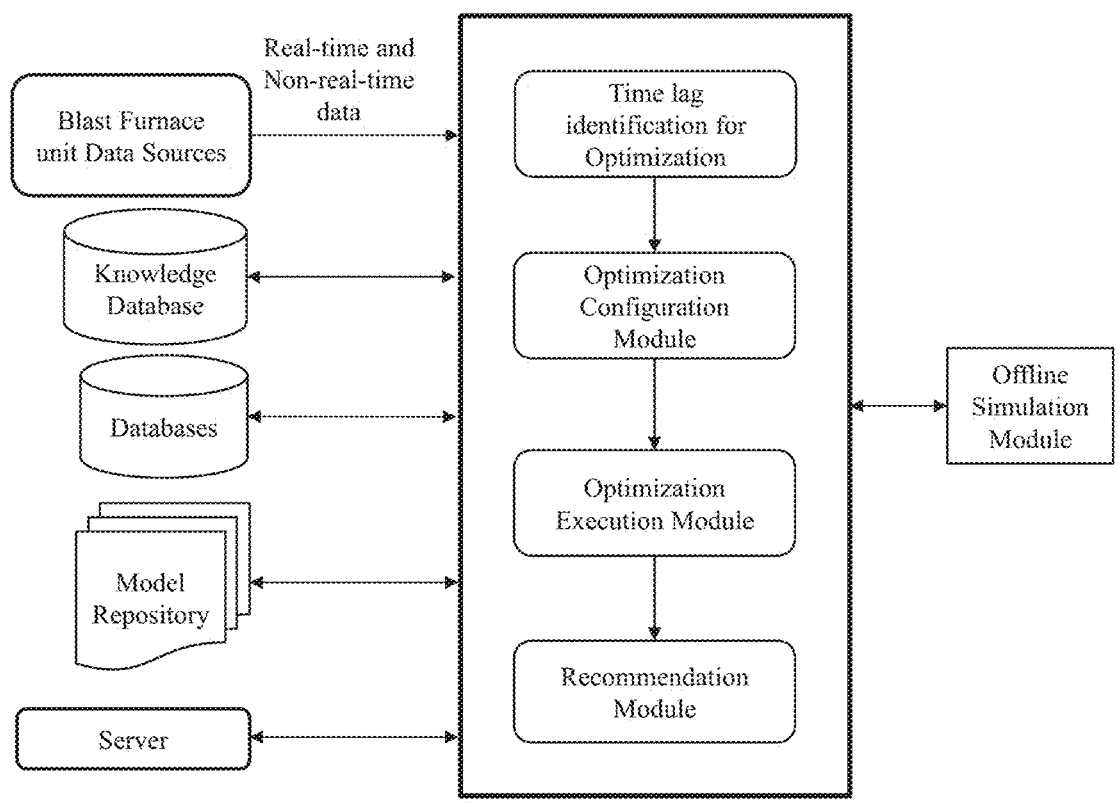
FIG. 8 is a block diagram of an optimization module of the system of FIG. 3, according to some embodiments of the present disclosure.
Figure 9A:
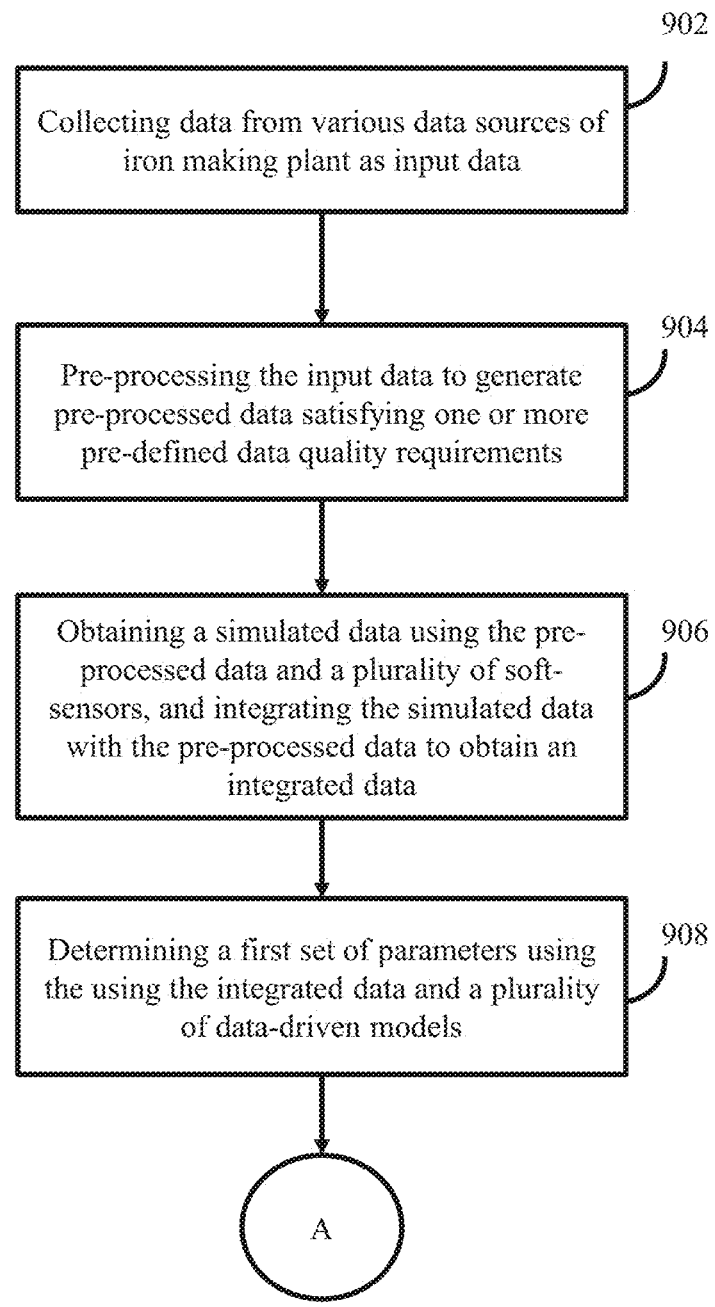
FIGS. 9A, 9B, and 9C (collectively referred to as FIG. 9) show a flow diagram illustrating steps involved in the performing optimization of the ironmaking plant, using the system of FIG. 1, in accordance with some embodiments of the present disclosure.
Figure 9B:
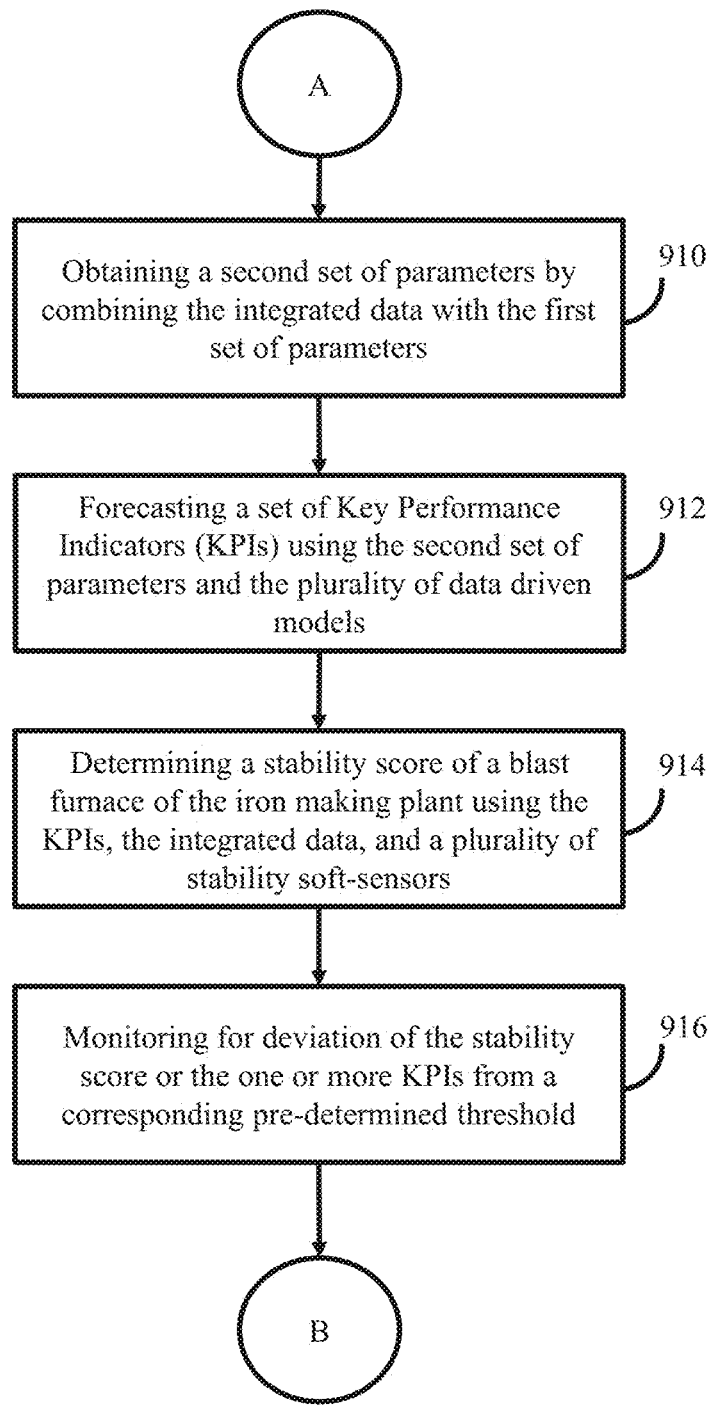
Figure 9C:
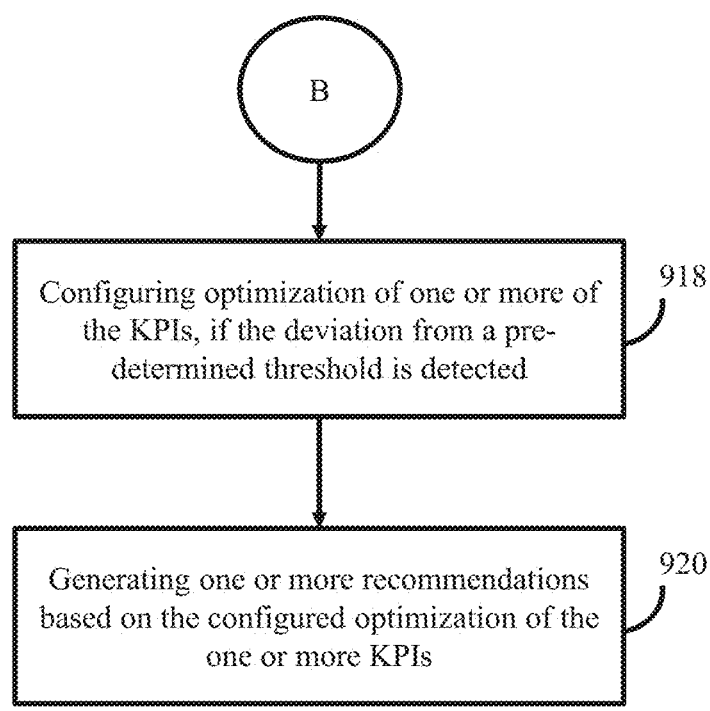

Further, at step 914, a Blast Furnace Stability Index (BFSI) module of the system 100 determines a stability score of a blast furnace of the ironmaking plant, using the forecasted KPIs, the integrated data, and a plurality of stability soft sensors. Various components of the BFSI module are depicted in FIG. 6. In an embodiment, the system 100 determines the stability score based on an estimated cohesive zone (CZ) characteristics of a blast furnace of the ironmaking plant. At this step, initially the system 100 calculates an area index, thickness index, and root location index of a cohesive zone in the blast furnace, as estimated values. The system 100 then retrieves values of the area, the thickness and the root location of a desired cohesive zone profile corresponding to a plurality of current operating conditions of the blast furnace. Further, the area index, the thickness index and the root location index are calculated as ratios of the estimated values and the retrieved values. A schematic showing CZ area, thickness and root location inside the blast furnace is given in FIG. 6. Further, the system 100 determines a shape index of the cohesive zone of the blast furnace. Further, the system 100 computes a stability score of the blast furnace based on the calculated area index, thickness index, root location index, and the shape index of the CZ. The detailed steps involved in determining the stability score are elaborated below: Initially, the blast furnace stability index module of the system of FIG. 3 receives data related to the raw material quality, burden distribution pattern and descent rate, and blast furnace process parameters such as above-burden probe temperatures, stave temperatures, cooling water temperatures, hearth level temperatures, etc., from the integrated data. Simulated data such as permeability, solution loss carbon, raceway adiabatic flame temperature (RAFT), etc. from the physics-based blast furnace models is sourced from the offline simulation module and the data related to the historic CZ patterns is sourced from the model repository and the knowledge database. The CZ Area, Thickness, Root location Index module initially estimates the area, thickness and root location of the cohesive zone using the received data by:

1. Creating one or more databases by executing high-fidelity Computational Fluid Dynamic (CFD) models of the blast furnace using a subset of information collected from various sensors. The one or more databases contain information related to the burden descent rates corresponding to different wall temperatures, burden charging pattern, cooling water temperatures and flow rates for the current working conditions. For real time applications (estimations), such one or more databases may be created for different blast furnaces and corresponding operating conditions.

2. Estimating the burden descent rate from the steel wall temperatures determined using cooling water data. The wall temperatures are estimated from the cooling water temperature and flow rate using heat transfer equations. The burden descent rate is further calculated using these wall temperatures. Since the wall temperatures are representative of the temperature inside the furnace, for a temperature at a set location x near CZ, temperature Tczx is a representative temperature of the burden at location x. The temperature is lower if the burden descent rate is higher. Thus, using the data from the CFD simulations stored in the database, a relationship between the temperature Tczx and burden descent rate, which is inversely proportional, is derived.

The burden descent rate is estimated as:

$$BDRx = \theta_1(Tczx) + \theta_2$$

where,
BDRx is the burden descent rate for location x,
Tczx is the wall temperature for location x,
$\theta_1$ is a negative number defining the slope and
$\theta_2$ is a constant representative of the intercept 3. Estimating the area, thickness and root location of the CZ for the current operating conditions using the determined burden descent rate, a burden charging pattern and a plurality of data-driven models of the blast furnace.

The final CZ area, thickness and root location indices are estimated as follows:

$$CZ \text{ area index, } CZAI = \frac{CZA_x}{CZA_o}$$

$$CZ \text{ thickness index, } CZTI = \frac{CZT_x}{CZT_o}$$

$$CZ \text{ root location index, } CZRLI = \frac{CZRL_x}{CZRL_o}$$

where,
CZAx, CZTx, CZRLx are the estimated area, thickness and root location
CZAo, CZTo, CZRLo are the desired area, thickness and root location indices of the cohesize zone corresponding to the plurality of current operations of the blast furnace retrieved from a plurality of databases.

The shape index of the CZ indicates the shape of the CZ and is another key component of the stability of the furnace. The top gas profile, the burden charging pattern represents consumption, reactions across a cross-section of the blast furnace and the burden descent rate determine the shape profile of the CZ. To determine the shape index, a historic pattern matching is done using a thermal profile data corresponding to the CZ. In an embodiment, the thermal profile of the CZ is determined based on estimated values from the wall temperatures, and cooling water temperature data. Further, information on a plurality of desired CZ shape profiles such as but not limited to inverted V, W and flat, etc. for different operating conditions of the blast furnace and corresponding parameter values for the desired profiles are defined and configured within the database 108. Retrieval of the desired CZ shape profile for the current operating conditions of the furnace from the database is automated. By comparing the estimated shape profile of the CZ with the plurality of retrieved desired CZ profiles, the CZ shape index module identifies one of the desired profiles that closely match the shape index profile of the CZ and estimate the shape index of the CZ based of this profile.

In other embodiments, a KNN (k-nearest neighbor) method or other similar methods may be used by the CZ shape index module to determine the desired profiles from the database.

In an embodiment, the CZ shape index module may use one or more clustering approaches or distance metrics for scoring each of the retrieved desired profiles based on closeness with the estimated shape profile of the CZ. Consider the example below:

The CZ shape index module calculates the closeness of various parameters in the shape profile of the CZ with values of corresponding parameters in each of the desired profiles. A final score of the closeness for each of the desired profiles is obtained as the weighted distance between the values of the parameters of the shape index profile of the CZ and the corresponding values in each of the desired profiles as follows:

$$\text{CZ Shape Index}, CZSI = |W_{desired} - W_{current}|$$

where, $W_{desired}$ is the weighted sum of parameter values for the desired profile, $W_{current}$ is the weighted sum of parameter values for the shape profile of the CZ. CZSI value closer to 0 represents a desired operation, and therefore better operation and stability.

Further, the blast furnace stability score is estimated as composite score of the estimated CZ indices as follows:

$$BFSI = \alpha \cdot CZAI + \beta \cdot CZTI + \gamma \cdot CZRLI + \delta \cdot CZSI$$

where, $\alpha$, $\beta$, $\gamma$ and $\delta$ are the respective weights. The composite score can be estimated using various averaging techniques such as simple weighted average, logarithmic average, etc. Additionally, terms related to the thermal stability of the blast furnace can also be incorporated into the blast furnace stability score calculation. Further, at step 916, the system 100 performs continuous monitoring of the various blast furnace KPIs and the stability score, using the product quality assurance module, for any variation of the KPIs and/or the stability score from a corresponding threshold using a plurality of data-driven techniques such as but not limited to mean hypothesis, auto-encoder, etc. In an embodiment, a different threshold is defined for each of the KPIs and for the stability score. If a deviation is detected for at least one of the KPIs or for the stability score, then at step 918, the system 100 configures optimization of the one or more KPIs and/or the stability score. The system also diagnoses the root causes of the deviations using a plurality of data-driven techniques.

The optimization of various objectives considering the blast furnace stability index, appropriate time lags between the features, blast furnace KPIs and other operational constraints is handled by the system 100 using the optimization module as depicted in FIG. 6. The optimization is triggered if the BFSI value and/or one or more of the KPIs deviate from their corresponding thresholds. In an embodiment, the optimization can be triggered to achieve one or more of a plurality of objectives. Some examples of the objectives are reducing the fuel rate, emissions and cost of operation and improving the productivity and quality of hot metal. The optimization module may be configured to perform the optimization based on a single objective or based on multiple objectives. In another embodiment, the optimization is triggered periodically at pre-configured intervals (e.g., every 2 hours) or by the user manually after observing the current operating state of the ironmaking plant.

When the optimization is triggered, the optimization module estimates the optimal set points of a plurality of manipulated variables (MVs) of the plant. A time lag information which represents time lag for various process variables and variables groups with respect to corresponding blast furnace KPIs is used by the optimization module for mapping the selected variables with the blast furnace KPIs related to the objectives and constraints. The time lag identification module as in FIG. 5 identifies the time lag information using the following approach:

The data preparation module conditions the received plurality of data by matching sampling frequencies of all the features in the data to a scale of the KPI for which the time lag identification is being done. A groups formation module creates the feature groups corresponding to same source and thus having the similar time lag. For example, in the ironmaking plant, a first group can be formed based on the source of the raw materials i.e. coke/sinter/pellet plant. Similarly, locations of the sensors/probes capturing the data may be another criterion. In another example, type of the property such as chemical composition or size distribution of a material etc. can be another criterion for grouping. The time lag creation module creates all the possible time lags in the time period range specified by domain experts and stored in the knowledge database. After grouping and tagging of data, lag identification is carried out using the various techniques such as but not limited to scores from regression models, correlation analysis, and feature selection. Further, a lag scoring module scores the different time lags. Following this, appropriate time lags are shortlisted, and validated by the identification and validation module. It is to be noted that working of the time lag identification module is elaborated in detail in Applicant's Indian patent application IN 202021004042.

Based on the identified/determined time lag, an optimization configuration module of the optimization module is configured to define an optimization problem that comprises:

One or more objective functions,

Plurality of manipulated variables (MVs) and their limits, and

Various process, operations, quality and safety constraints and their bounds.

Manipulated variables or decision variables are the process variables that can be modulated by operators to influence the performance of any industrial plant. The typical list of MVs relevant to the ironmaking plant are shown in Table X. Once an optimization problem is configured, it can be reused any number of times for execution by the optimization execution module. An optimization execution module of the optimization module executes the configured optimization problem using a single or a multi-objective optimization solver depending on the number of objective functions specified in the optimization problem, corresponding pareto fronts etc. A single objective optimization problem consists of a single objective. For example, maximizing blast furnace productivity with constraints on hot metal quality, stability, emissions, etc. in order to find optimal settings for a subset or the entire set of ironmaking plant MVs. Multi-objective optimization comprise of more than one objective function. For example, minimizing fuel rate in the furnace while maximizing blast furnace productivity with constraints on hot metal quality, stability, emissions, and safety in order to find optimal settings for a subset or entire set of ironmaking plant MVs. By solving the optimization problems using a plurality of optimization solvers, the optimization execution module generate a plurality of set points for one or more of the MVs. The optimization module may then generate one or more recommendations based on the set points, at step 920, which may be provided to a user of the system 100 via one or more suitable interfaces. In various embodiments, the system 100 may share the recommendations in personal digital devices or a common visual interface device being used by the user. In another embodiment, the optimization module may feed information on the obtained set points to a control system (not shown), which may then use the information on the obtained set points to control one or more of the units of the ironmaking plant, to improve performance of the one or more of the units, and in turn overall performance of the plant.

An offline simulation module of the system 100 is used to run various physics-based models, and/or other data-based models and generate additional simulated data to be used as inputs by the other modules of the system 100, that are running in real-time. The offline simulation includes a plurality of models for estimating BFSI, time-lag incorporated optimization module, and root cause identification for detected anomalies/abnormalities, etc. The offline simulation module may also be used for conducting offline analysis and to analyze historic events, patterns and causes, etc.

According to an embodiment of the disclosure, referring to FIG. 3, the self-learning module is configured to monitor the performance of the plurality of physics-based and data-driven models of the pre-ironmaking units and the blast furnace and retune/retrain the models in case of a drift in their performance. For data-driven models, either the hyper-parameters of the models are re-tuned or models are re-trained in case of a performance drift. For physics-based models, the tuning parameters are re-tuned in case of a performance drift. The re-tuned and re-trained models are stored in the model repository and may be activated for prediction in the prediction and forecasting module.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of optimization of ironmaking plant. The embodiment thus provides a method and system for determining a blast furnace stability index (BFSI) score of an ironmaking plant. Moreover, the embodiments herein further provide a method and system of optimization of the ironmaking plant based on the determined BFSI score or based on one or more KPIs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for optimization of an ironmaking plant, comprising:
    collecting data from a plurality of data sources of the ironmaking plant as input data, via one or more hardware processors;
    pre-processing the input data to generate a pre-processed data, via the one or more hardware processors, comprising conditioning the input data to satisfy one or more pre-defined data quality requirements;

obtaining, via the one or more hardware processors, a simulated data using the pre-processed data and a plurality of soft sensors, wherein the simulated data is integrated with the pre-processed data to obtain an integrated data;

determining, via the one or more hardware processors, a first set of parameters using the integrated data and a plurality of data-driven models, for a plurality of pre-ironmaking units of the ironmaking plant;

obtaining, via the one or more hardware processors, a second set of parameters by combining the integrated data with the first set of parameters;

forecasting, via the one or more hardware processors, a set of key performance indicators (KPIs) using the second set of parameters and the plurality of data-driven models of the ironmaking plant;

determining a stability score of a blast furnace of the ironmaking plant, using the forecasted set of KPIs, the integrated data, and a plurality of stability score soft-sensors, via the one or more hardware processors, wherein the stability score represents a determined operating stability of the blast furnace;

monitoring for deviation of one or more of the forecasted KPIs or the stability score, from a corresponding pre-determined threshold, via the one or more hardware processors;

configuring optimization of one or more of the forecasted KPIs, using the determined stability score as a constraint, if the deviation from the pre-determined threshold is detected, via the one or more hardware processors, wherein the optimization of the one or more of the plurality of KPIs comprises identifying a plurality of optimum set points;

generating one or more recommendations based on the configured optimization of the one or more KPIs, via the one or more hardware processors; and controlling the ironmaking plant based on the set points.

2. The method of claim 1, wherein determining the stability score comprises:

calculating an area index, a thickness index, and a root location index of the cohesive zone in the blast furnace;

determining a shape index of the cohesive zone of the blast furnace; and computing the stability score based on the calculated area index, thickness index, root location index, and shape index of the cohesive zone.

3. The method of claim 2, wherein calculating the area index, thickness index, and root location index of the cohesive zone comprises:

determining value of a burden descent rate of the blast furnace, wherein the value of the burden descent rate is determined from estimated values of wall temperatures;

estimating an area, a thickness, and a root location using the determined burden descent rate, a burden charging pattern, and the plurality of data-driven models;

retrieving values of the area, the thickness and the root location of a desired cohesive zone profile corresponding to a plurality of current operating conditions of the blast furnace; and calculating the area index, the thickness index and the root location index as ratios of the estimated values and the retrieved values.

4. The method of claim 2, wherein determining the shape index comprises:

retrieving values of a plurality of process parameters of a desired cohesive zone profile corresponding to a plurality of current operating conditions of the blast furnace; and determining the shape index as a weighted distance between the values of the retrieved plurality of process parameters and collected values of the plurality of the process parameters of the cohesive zone.

5. The method of claim 1, wherein optimizing one or more of the plurality of KPIs comprises identifying a plurality of optimum set points of each a plurality of manipulated variables of the blast furnace, based on the stability score, and a determined time lag.

6. The method of claim 5, wherein determining the time lag comprises:

grouping a plurality of parameters from the pre-processed data, based on a domain knowledge data, wherein the domain knowledge data comprises hierarchy of ironmaking plant and type of input data, to generate one or more parameter groups;

creating a plurality of time lags for data in the one or more parameter groups for which time lag information is not available, and tagging the created time lag with the corresponding parameters; and scoring the created time lags.

7. The method of claim 1, wherein the first set of parameters comprises key performance indicators, process and product soft-sensors from a plurality of pre-ironmaking units.

8. The method of claim 1, wherein the plurality of data sources comprises a historical database, a laboratory database, and an environment database.

9. A system for optimization of an ironmaking plant, comprising:

one or more hardware processors;

a user interface; and a memory storing a plurality of instructions, wherein the plurality of instructions when executed, cause the hardware processors to:

collect data from a plurality of data sources of the ironmaking plant as input data;

pre-process the input data to generate a pre-processed data, comprising conditioning the input data to satisfy one or more pre-defined data quality requirements;

obtain a simulated data using the pre-processed data and a plurality of soft sensors, wherein the simulated data is integrated with the pre-processed data to obtain an integrated data;

determine, a first set of parameters using the integrated data and a plurality of data-driven models, for a plurality of pre-ironmaking units of the ironmaking plant;

obtain, a second set of parameters by combining the integrated data with the first set of parameters;

forecast, a set of key performance indicators (KPIs) using the second set of parameters and the plurality of data-driven models of the ironmaking plant;

determine a stability score of a blast furnace of the ironmaking plant, using the forecasted set of KPIs, the integrated data, and a plurality of stability score soft-sensors, wherein the stability score represents a determined operating stability of the blast furnace;

monitor for deviation of one or more of the forecasted KPIs or the stability score, from a corresponding pre-determined threshold;

configure optimization of one or more of the forecasted KPIs, using the determined stability score as a constraint, if the deviation from the pre-determined threshold is detected, wherein the optimization of the one or more of the plurality of KPIs comprises identifying a plurality of optimum set points;

generate one or more recommendations based on the configured optimization of the one or more KPIs; and control the ironmaking plant based on the set points.

10. The system as claimed in claim 9, wherein the system determines the stability score by:

calculating an area index, a thickness index, and a root location index of the cohesive zone in the blast furnace;

determining a shape index of the cohesive zone of the blast furnace; and computing the stability score based on the calculated area index, thickness index, root location index, and shape index of the cohesive zone.

11. The system as claimed in claim 10, wherein the system calculates the area index, thickness index, and root location index of the cohesive zone by:

determining value of a burden descent rate of the blast furnace, wherein the value of the burden descent rate is determined from an estimated value of wall temperatures;

estimating an area, a thickness, and a root location using the determined burden descent rate, a burden charging pattern, and the plurality of data-driven models;

retrieving values of area, thickness and root location of a desired cohesive zone profile corresponding to a plurality of current operating conditions of the blast furnace; and calculating the area index, the thickness index and the root location index as ratios of the estimated values and the retrieved values.

12. The system as claimed in claim 10, wherein the system determines the shape index by:

retrieving values of a plurality of process parameters of a desired cohesive zone profile corresponding to a plurality of current operating conditions of the blast furnace; and determining the shape index as a weighted distance between the values of the retrieved plurality of process parameters and collected values of the plurality of the process parameters of the cohesive zone.

13. The system as claimed in claim 9, wherein the system optimizes one or more of the plurality of KPIs by identifying a plurality of optimum set points of each a plurality of manipulated variables of the blast furnace, based on the stability score, and a determined time lag.

14. The system as claimed in claim 13, wherein the system determines the time lag by:

grouping a plurality of parameters from the pre-processed data, based on a domain knowledge data, wherein the domain knowledge data comprises hierarchy of ironmaking plant and type of input data, to generate one or more parameter groups;

creating a plurality of time lags for data in the one or more parameter groups for which time lag information is not available, and tagging the created time lag with the corresponding parameters; and scoring the created time lags.

15. The system as claimed in claim 9, wherein the first set of parameters comprises key performance indicators, process and product soft-sensors from a plurality of pre-ironmaking units.

16. The system as claimed in claim 9, wherein the plurality of data sources comprises a historical database, a laboratory database, and an environment database.

17. One or more non-transitory machine-readable information storage mediums comprising one or more instructions which when executed by one or more hardware processors cause:

collecting data from a plurality of data sources of the ironmaking plant as input data;

pre-processing the input data to generate a pre-processed data, comprising conditioning the input data to satisfy one or more pre-defined data quality requirements;

obtaining, a simulated data using the pre-processed data and a plurality of soft sensors, wherein the simulated data is integrated with the pre-processed data to obtain an integrated data;

determining, a first set of parameters using the integrated data and a plurality of data-driven models, for a plurality of pre-ironmaking units of the ironmaking plant;

obtaining, a second set of parameters by combining the integrated data with the first set of parameters;

forecasting, a set of key performance indicators (KPIs) using the second set of parameters and the plurality of data-driven models of the ironmaking plant;

determining a stability score of a blast furnace of the ironmaking plant, using the forecasted set of KPIs, the integrated data, and a plurality of stability score soft-sensors, wherein the stability score represents a determined operating stability of the blast furnace;

monitoring for deviation of one or more of the forecasted KPIs or the stability score, from a corresponding pre-determined threshold;

configuring optimization of one or more of the forecasted KPIs, using the determined stability score as a constraint, if the deviation from the pre-determined threshold is detected, wherein the optimization of the one or more of the plurality of KPIs comprises identifying a plurality of optimum set points;

generating one or more recommendations based on the configured optimization of the one or more KPIs; and controlling the ironmaking plant based on the set points.

* * * * *